Oct. 29, 1963 P. J. CHRISLER 3,108,746

DATA CORRELATING DEVICE

Filed July 10, 1961 3 Sheets-Sheet 1

INVENTOR.
Peter J. Chrisler
BY
Townsend and Townsend
attorneys

Oct. 29, 1963 P. J. CHRISLER 3,108,746

DATA CORRELATING DEVICE

Filed July 10, 1961 3 Sheets-Sheet 2

INVENTOR.
Peter J. Chrisler
BY
Townsend and Townsend
attorneys

INVENTOR.
Peter J. Chrisler
BY
Townsend and Townsend
attorneys

United States Patent Office 3,108,746

Patented Oct. 29, 1963

3,108,746

DATA CORRELATING DEVICE

Peter J. Chrisler, 2225 21st St., Sacramento 18, Calif.

Filed July 10, 1961, Ser. No. 123,045
2 Claims. (Cl. 235—78)

This invention relates to a data correlating device. In a specific application, insurance premiums are correlated with types and extent of insurance coverage so that the total premium for a selected coverage may be directly determined by means of the device.

The advantage offered by the present device is the ability to read the total premium directly for a plurality of different items of coverage. For example, in the field of automobile insurance, the present device permits the correlation of a selected amount of liability insurance, a selected amount of physical damage insurance, a selected amount of medical insurance, and the like directly to the total premium without the necessity of adding up individual figures for each item. The device is adapted to record large amounts of data thereon and thus all of the various factors which determine premium rate, such as particular use to which the automobile will be put, number of automobiles insured, and perhaps driving record of the operator, may be taken into consideration. The particular configuration of the device provides space for the many different totals resulting from the effect of each variable.

Generally, the device provided by the present invention is a means for recording large quantities of data thereon and visibly isolating selected portions for correlation with other selected portions. The device includes a base disc having data recorded on at least one face thereof. A partial disc defining an open sector is rotatably mounted about the axis of the base disc with one face closely spaced from a data-containing face of the base disc. Data is recorded on the other face of the partial disc, that is, on the face of the partial disc turned away from the base disc. Selected data on the base disc may be viewed by rotating the partial disc so that its open sector overlies the selected data on the base disc.

The device also includes a disc segment rotatably mounted about the axis of the base disc with one face closely spaced from the partial disc. Data is recorded on the other face of the disc segment, that is, on the face of the disc segment turned away from the partial disc. The disc segment is rotatable and adapted for visibly isolating selected data on the partial disc whereby data on the disc segment may be correlated with the isolated data.

The disc segment is also rotatable in cooperation with the rotation of the partial disc so that the disc segment may visibly isolate selected data on the base disc appearing through the open sector of the partial disc whereby data on the disc segment may be correlated with data isolated on the base disc.

Use of the base disc in combination and cooperation with a partial disc as described permits the recordation of a large amount of data on a relatively small unit in terms of bulk.

Reference is made to the accompanying drawings in which.

Figure 2:
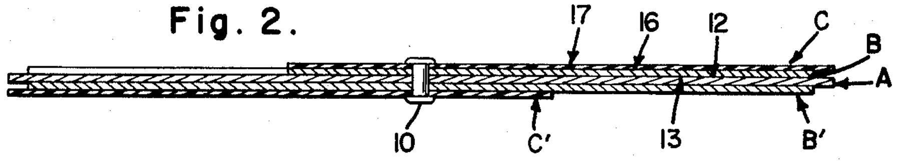
FIG. 2 shows the device of FIG. 1 in side section taken along the line 2—2 of FIG. 1.
Figure 3:
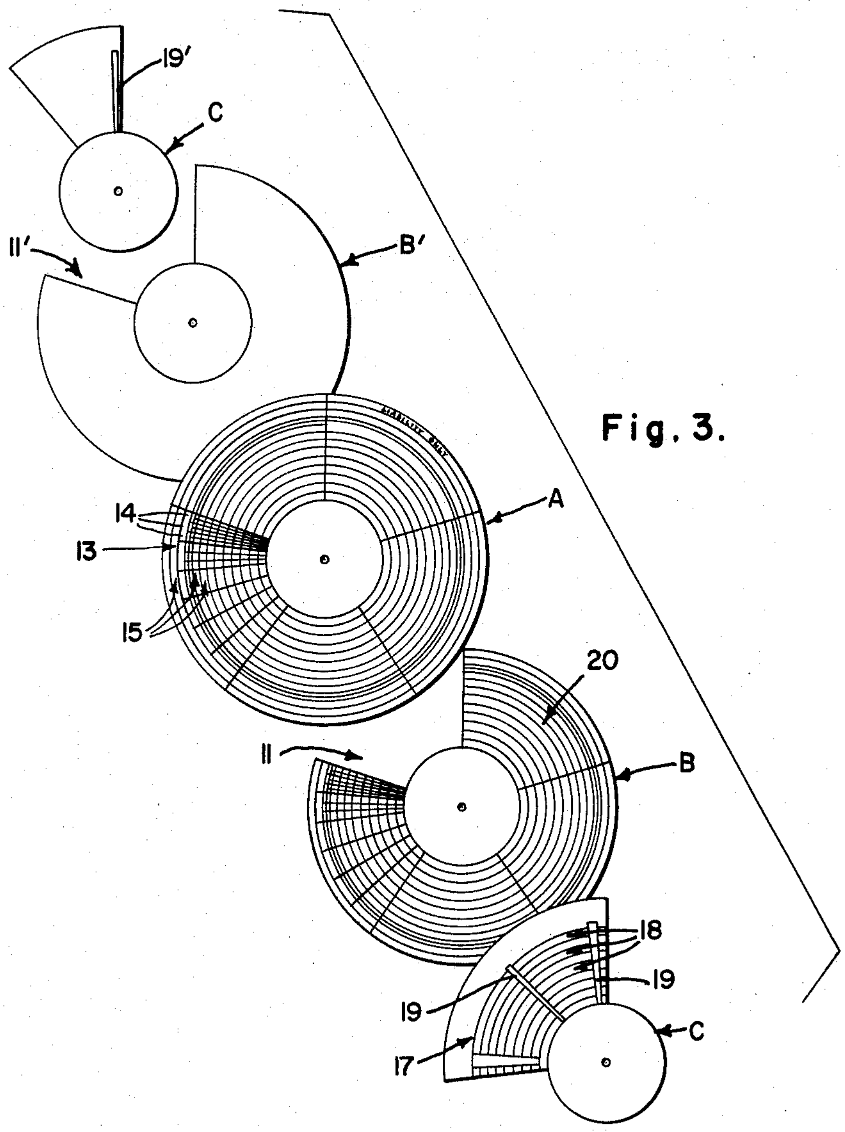
FIG. 3 is an exploded view in top elevation and in reduced scale of the device shown in FIG. 1.

With reference to FIG. 3 in particular, the major components of the preferred embodiment shown include a base disc A, a partial disc B, and a disc segment C. Optionally, the device includes a partial disc B′ and a disc segment C′. The foregoing components are assembled as best seen in FIG. 2. Partial disc B is rotatably mounted about the axis of base disc A by means of flanged shaft 10 which passes through the axis of base disc A. Similarly, disc segment C and partial disc B′ and disc segment C′ are rotatably mounted about the axis of base disc A by means of flanged shaft 10.

It will be obvious that the present device may be employed when having only a base disc A and a partial disc B and a disc segment C. The use of the additional partial disc B′ and disc segment C′ is necessary only when the amount of data to be recorded for correlation is comparatively large. For ease of description, only partial disc B and disc segment C will be described in detail with their relation to face 13 of base disc A. The description that follows should be taken as applicable however, to partial disc B′ and disc segment C′ and their relation to face 13′ of base disc A. Corresponding prime numbers have been applied where needed to partial disc B′ and disc segment C′ as an aid in transposing the description of partial disc B and disc segment C to B′ and C′.

Partial disc B has a portion cut away to define an open sector shown generally at 11. Partial disc B is rotatably mounted with one face 12 thereof closely spaced from face 13 of base disc A.

Figure 1:
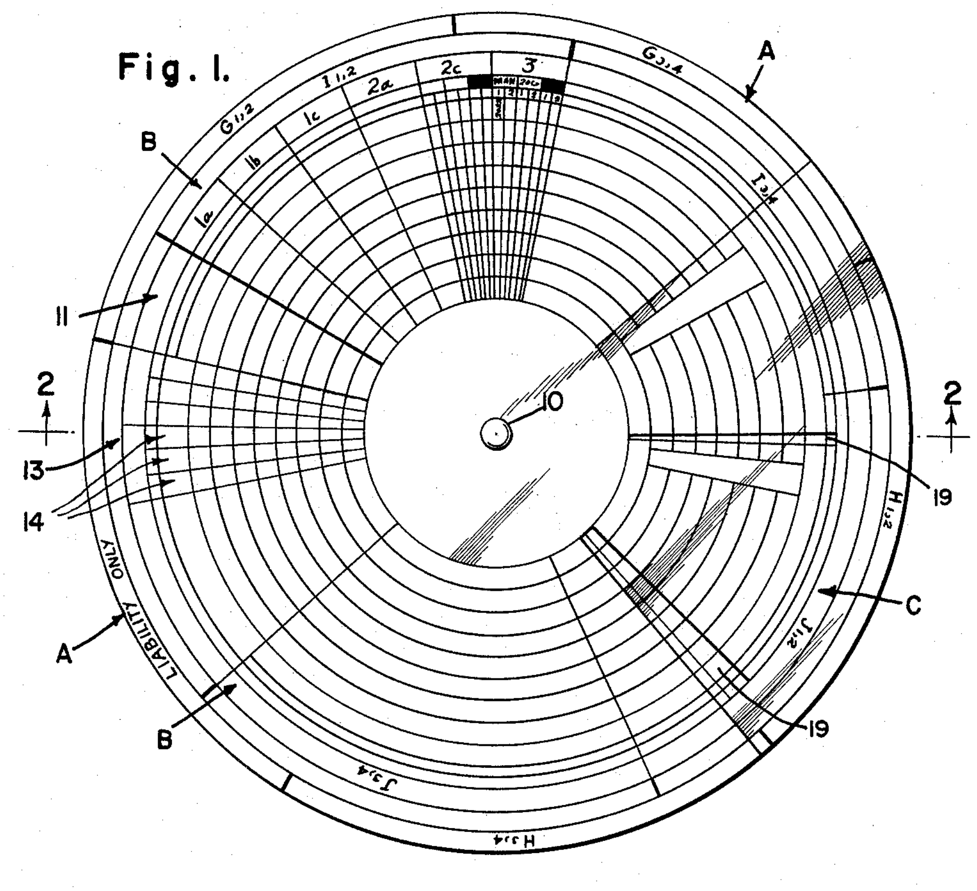
FIG. 1 shows in top elevation a device of the present invention with areas outlined in which to record data.

Base disc A contains data recorded on its face 13, preferably arranged in radial lines 14 and concentric circles 15. Similarly, face 20 contains radial lines 14*a* and concentric circles 15*a* of data. A selected line of data 14 on face 13 of base disc A may be viewed by rotating partial disc B so that its open sector 11 overlies the selected radial line of data. This may best be illustrated with reference to FIG. 1 wherein radial columns 14 (data not shown) on face 13 of base disc A may be viewed through open sector 11 of partial disc B.

Figures 4, 5:
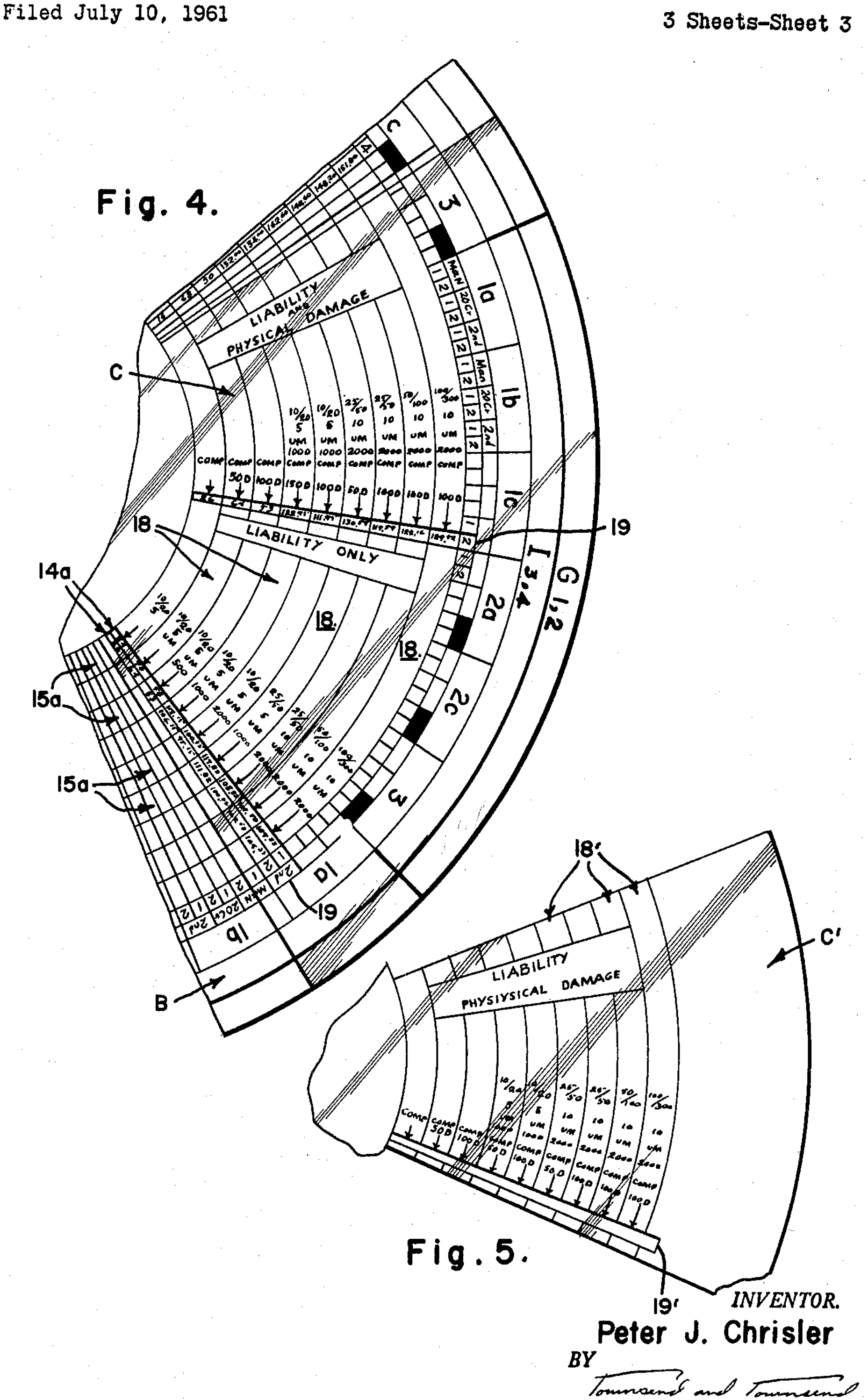
FIG. 4 shows in top elevation a portion of the device of FIG. 1 with data recorded thereon in representative appropriate areas for correlation therebetween.
FIG. 5 shows in top elevation one of the disc segments of the device of FIGS. 1–3 with data recorded thereon in one appropriate manner.

Disc segment C is closely spaced from partial disc B with one face 16 thereof closely spaced from face 20 of partial disc B. The other face 17 of disc segment C that is turned away from partial disc B has data recorded thereon. Preferably, the data recorded on disc segment C is placed in concentric circles 18 whose radii are of substantially equal length to corresponding radii of the concentric circles 15 on base disc A and 15*a* on partial disc B. If the corresponding radii of concentric circles 18 and 15 and 15*a* are substantially equal, correlation of data along a radial line 14 or 14*a* is facilitated. This is best seen in FIG. 4.

Disc segment C has a plurality of radial windows 19 cut from its body and defined thereby. Radial windows 19 serve to visibly isolate radial lines of data 14 recorded on face 13 of base disc A and radial lines 14*a* recorded on face 20 of partial disc B. It is noted for example as shown in FIGS. 4 and 5, that disc segment C has a plurality of windows 19 while disc segment C′ has only one window 19′. The plurality of windows 19 on disc segment C permits the data recorded on its face 17 to be segregated into a plurality of groupings with each data grouping being associated with a different one of said radial windows. Consequently, a selected radial line of data on base disc A or partial disc B may be isolated by any selected window 19 and the isolated line correlated with the data grouping associated with the selected window 19. A greater number of different combinations of items of data for correlation are thereby obtained.

It will be obvious at this point that the present invention contemplates the use of a plurality of partial discs B if additional space for the recordation of data is needed. The added partial discs are utilized in the same way as disc B.

Operation of the device requires rotation of disc segment C to a position whereby one of the windows 19 visibly isolates at least one selected radial line of data 14a on face 20 of partial disc B. The concentric circles of data 18 on disc segment C may then be correlated with corresponding circles of data 15a on partial disc B.

Alternatively, window 19 of disc segment C may be used to visibly isolate a radial line of data 14 on face 13 of base disc A by rotating partial disc B in cooperation with disc segment C so that open sector 11 of partial disc B overlies the selected radial line 14 of base disc A, whereupon the selected radial line 14 of base disc A may be viewed through the open sector 11. As before, window 19 visibly isolates the line 14, and the concentric circles of data 15 on base disc A may be correlated with the concentric circle of data 18 on disc segment C.

As illustrated in the drawings, the present device is used to correlate total insurance premiums recorded on base disc A and partial disc B with types and extent of coverage on disc segment C. Selection of the appropriate radial line of data representing total premiums on discs A or B is made with reference to premium rating conditions such as type of automobile, use contemplated, and driving record of the operator, and the like. Radial lines 14 and 14a are appropriately coded and identified to aid in the proper selection. Correlation of the proper corresponding concentric circle on disc A or B with the concentric circle of C having the type and extent of coverage desired permits the direct reading of the total premium without the necessity of adding up premiums for each item of coverage.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A device for recording large quantities of data thereon and visibly isolating selected portions for correlation with other selected portions thereof comprising: a base disc of first radius having first data recorded on at least one face thereof arranged at certain intervals along radial lines from the center of said disc, adjacent groups of said first data forming a family of concentric circles about said center; a second disc of second radius which is rotatably mounted at its center about said center of said base disc, with an open sector in said second disc bounded by two radii of said second disc, and one face closely spaced from said base disc and having second data recorded on its other face arranged at intervals along radial lines from the center of said second disc, adjacent groups of said second data forming a family of partial concentric circles about said center whose radii are substantially equal to the radii of said concentric circles of said base disc, whereby a selected region of said first data on said base disc may be selectively viewed by rotating said second disc so that its open sector exposes said selected region of said first data on said base disc; a disc segment of third radius, said radius at least coextensive with said first and second data on said first and second discs, rotatably mounted about its center on said center of said base disc with one face closely spaced from said second disc and having third data recorded on its other face at intervals along radial lines from the center of said disc segment, adjacent groups of said third data forming a family of partial concentric circles about said center, whose radii are substantially equal to the radii of said concentric circles on said base disc, said disc segment having at least one radial window adjacent to said third data and extending outwardly from the said center axis for a radial distance less than said third radius, said disc segment rotatable so that said window will overlie and thereby visibly isolate a selected radial line of said second data on said second disc whereby said third data on said disc segment may be correlated with said isolated line of said second data, said disc segment alternatively being rotatable in cooperation with the rotation of said second disc so that the radial window in said disc segment will visibly isolate a selected radial line of said first data on said base disc appearing through the open sector of said second disc whereby said third data on said disc segment may be correlated with the isolated line of said first data on said base disc.

2. A device in accordance with claim 1 wherein said disc segment has a plurality of radial windows defined therein and wherein the data recorded on its face is segregated into a plurality of groupings, each one of said data groupings being associated with a different one of said radial windows whereby a selected radial line of data may be isolated by a selected window and the isolated line correlated with the data grouping associated with the selected window.

References Cited in the file of this patent

UNITED STATES PATENTS

| | | |
|---|---|---|
| 1,412,043 | Crawford | Apr. 11, 1922 |
| 2,187,496 | Hess | Jan. 16, 1940 |
| 2,769,593 | Safranek et al. | Nov. 6, 1956 |
| 2,943,789 | Parigini | July 5, 1960 |